(12) United States Patent
Hinds

(10) Patent No.: US 6,910,321 B2
(45) Date of Patent: Jun. 28, 2005

(54) AIR-ASSISTED, TOPPER/SHREDDER FOR SUGAR CANE HARVESTER

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/637,143

(22) Filed: Aug. 8, 2003

(65) Prior Publication Data

US 2005/0028503 A1 Feb. 10, 2005

(51) Int. Cl.⁷ .............................................. A01D 45/02

(52) U.S. Cl. .......................................................... 56/63

(58) Field of Search ................................ 56/13.9, 13.3, 56/14.3, 14.5, 12.9, 16.4, 16.5, 11.9, DIG. 1; 460/57, 97, 123

(56) References Cited

U.S. PATENT DOCUMENTS

| 3,434,271 | A | * | 3/1969 | Fogels et al. | 56/60 |
| 3,596,447 | A | * | 8/1971 | Makeham et al. | 56/63 |
| 3,601,957 | A | * | 8/1971 | Duncan | 56/13.8 |
| 3,772,864 | A | * | 11/1973 | Rodrigue | 56/63 |
| 4,008,557 | A | * | 2/1977 | Ruback et al. | 56/63 |
| 4,019,308 | A | * | 4/1977 | Quick | 56/13.9 |
| 4,677,813 | A | * | 7/1987 | Stiff et al. | 56/13.9 |
| 5,031,392 | A | * | 7/1991 | Baker | 56/13.9 |
| 5,131,216 | A | * | 7/1992 | Otten et al. | 56/56 |
| 6,363,700 | B1 | | 4/2002 | Fowler | 56/13.9 |

FOREIGN PATENT DOCUMENTS

WO      WO 85/00268      *   1/1985   .......... A01D/45/10

* cited by examiner

*Primary Examiner*—Árpád Fábián Kovács

(57) ABSTRACT

A topper/shredder arrangement of a cane harvester is designed so that a stream of air is created that aids in carrying pieces of cane tops to a location outside the harvesting throat of the cane harvester.

5 Claims, 3 Drawing Sheets

AIR-ASSISTED, TOPPER/SHREDDER FOR SUGAR CANE HARVESTER

FIELD OF THE INVENTION

The present invention relates to sugar cane harvesters, and more specifically, relates to topper/shredders for such harvesters.

BACKGROUND OF THE INVENTION

Sugar cane harvesters are equipped with sugar cane topping devices which take off the upper part of a sugar cane stalk since it does not contain a worthwhile amount of sugar. Conventional topping devices operate such that the top of the sugar cane stalk is severed and thrown into the furrow adjacent to the row being harvested. The transport vehicle runs upon the discarded tops on the next pass through the field. In wet weather this becomes a problem. The tops tend to collect and are pushed in front of the non-powered front tires of the transport tractor or the non-powered tires of the transport wagon. This continues until the transport can no longer push the pile. If at this point, the pile is too high to climb, the transport must back up and try to jump the pile. This problem can get so bad that harvesting operations must be suspended.

In order to alleviate this "bull dozing" operation, topper/shredders have been used that shred the tops into smaller pieces. An example of a topper/shredder is disclosed in U.S. Pat. No. 6,363,700, granted to Fowler on Apr. 2, 2002. These devices have been used on both wholestick and chopper harvesters for many years, and are not as efficient in throwing the small shredded pieces as far as the conventional whole piece toppers. This results in some portion of the tops dropping into the throat of the harvester. To deliver cane having no more extraneous matter than that delivered by a harvester equipped with a conventional whole piece topper, the forward speed of the machine must be reduced.

SUMMARY OF THE INVENTION

According to the present invention there is provided an improved topper-shredder for use with a sugar cane harvester.

It is an object of the invention to provide a topper/shredder capable of depositing shredded cane stalk tops outwardly of the path followed by the throat of the harvester.

The above object is accomplished by a topper/shredder which incorporates blades for creating an air flow which aids in propelling the shredded cane top pieces outside the row being harvested.

This and other objects of the invention will become apparent from a reading of the ensuing description together with the appended drawings.

DESCRIPTION OF THE PREFERRED EMBODIMENT

Figure 1:
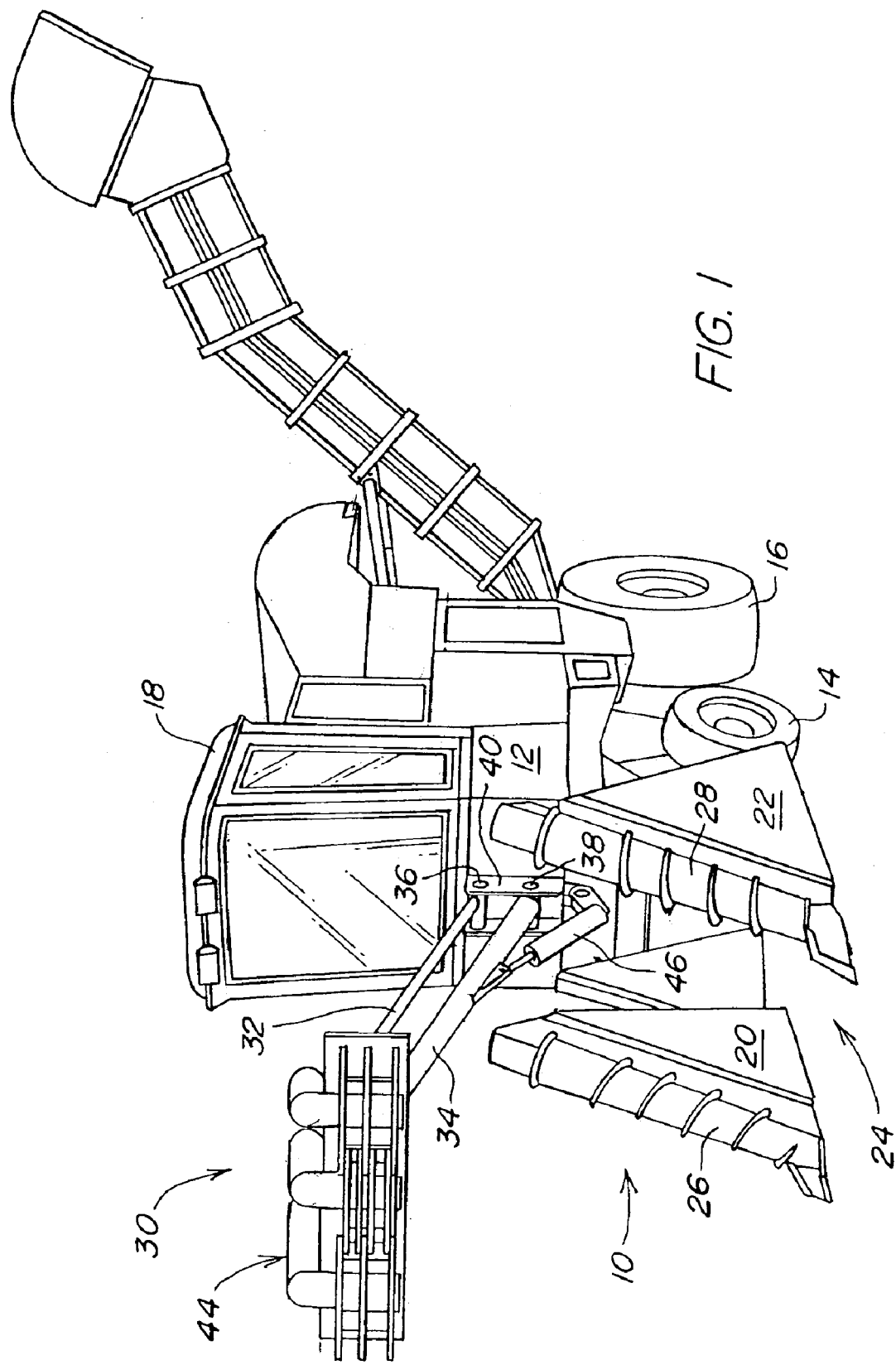
FIG. 1 is a left front perspective view of a sugar cane harvester embodying a topper/shredder constructed in accordance with the principles of the present invention.

Referring now to FIG. 1, there is shown a sugar cane combine or chopper harvester 10 including a main frame 12 supported on front and rear pairs of wheels 14 and 16, respectively. Mounted on a forward location of the frame 12 is an operator's cab 18 containing the various controls for operating the harvester 10.

Mounted to the forward end of the frame 12 are various components for harvesting a single row of sugar cane. Specifically, right-and left-hand row dividers 20 and 22 are provided for operation at opposite sides of a throat area 24 where a row of cane passes for being cut off by a pair of base cutters (not visible). The row dividers 20 and 22 respectively include spiral lifting devices 26 and 28 for elevating down or recumbent cane.

Figure 2:
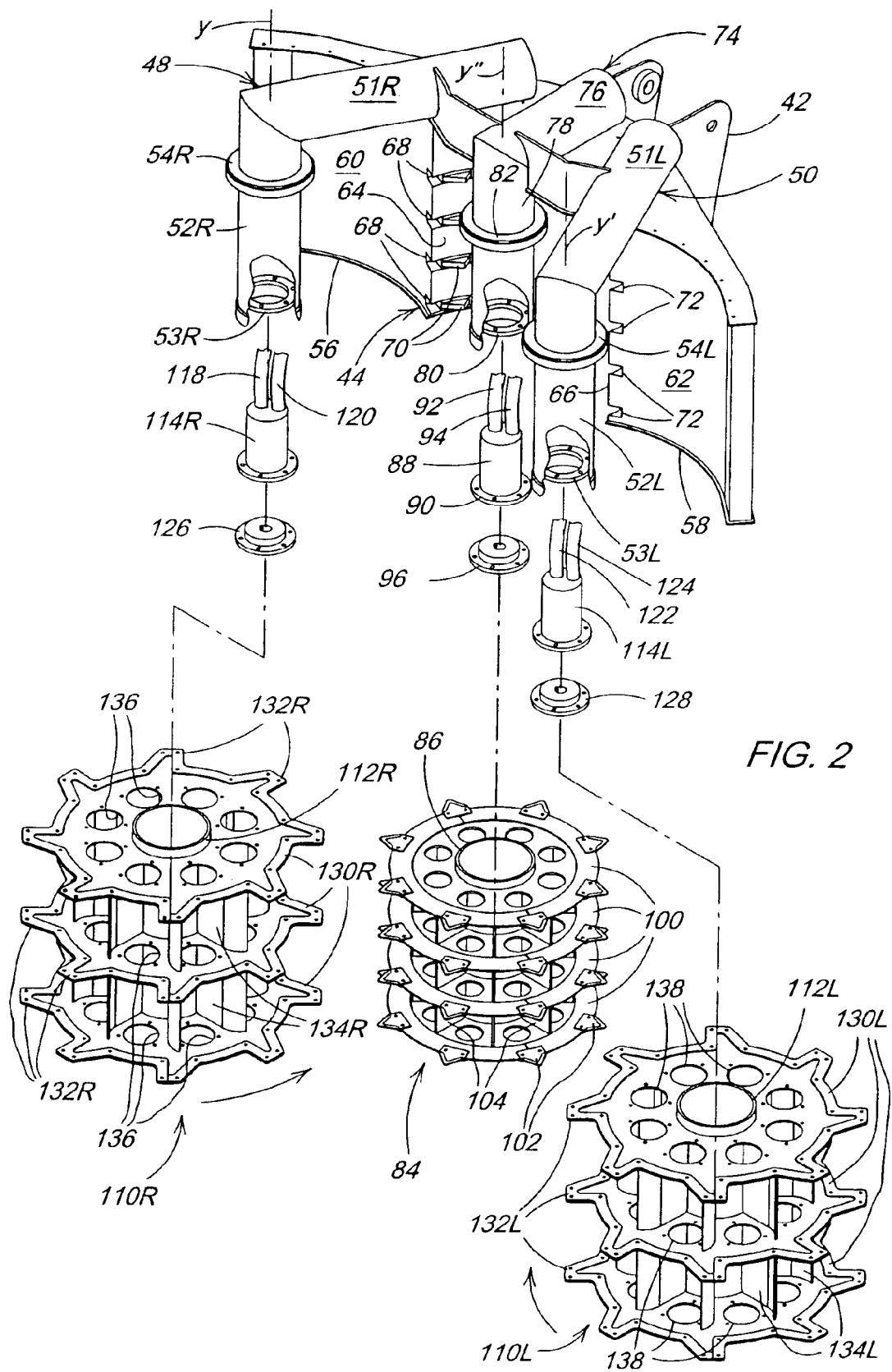
FIG. 2 is an exploded view of the topper/shredder shown in FIG. 1.

Located centrally between the row dividers 20 and 22 and coupled to the main frame 12 is a cane topper/shredder assembly 30 including a parallel linkage defined by parallel, upper and lower support arms 32 and 34, respectively. The upper and lower support arms 34 and 36 have respective rear ends pivotally coupled, as at upper and lower horizontal transverse pins 36 and 38, to upper and lower locations of an U-shaped bracket 40 fixed to an upper front location of the frame 12. Referring now also to FIG. 2, while hidden, it will be understood that respective forward ends of the parallel arms 32 and 34 are pivotally coupled to upper and lower locations of a U-shaped bracket 42 located at a center, rear location of a topper/shredder frame 44. Provided for adjusting the height of the topper/shredder is an extensible and retractable hydraulic cylinder 46 having its head end pivotally coupled to the harvester frame 12 and having its rod end pivotally attached to the lower arm 34.

The topper/shredder frame 44 includes right- and left-hand, L-shaped tubular support members 48 and 50, respectively. The right-hand support member 48 includes a horizontal section 51R and a vertical section 52R, with the latter extending along a vertical axis Y. A hydraulic motor mounting ring 53R is welded, or otherwise fixed, within a lower part of the vertical section 52R and a stop ring 54R is received on and fixed to an upper location of the vertical section 52R. Similarly, the left-hand support member 50 includes a horizontal section 51L and a vertical section 52L, with the latter extending along a vertical axis Y'. A hydraulic motor mounting ring 53L is fixed within a lower part of the vertical section 52L, and a stop ring 54L is received on and fixed to an upper part of the vertical section 52L. The horizontal sections 51R and 51L diverge forwardly from each other.

The frame 44 has right- and left-hand wing sections 56 and 58 which include forwardly facing surfaces 60 and 62 that are respectively curved about the vertical axes Y and Y'. The wing sections 56 and 58 have respective parallel, vertical, fore-and-aft extending inner walls 64 and 66. The inner wall 64 includes four vertically spaced, horizontal, knife-mounting slots 68 in which are mounted stationary cutting knives 70. Similarly, four vertically spaced knife-mounting slots 72 are provided in the inner wall 66 and are provided with stationary cutting knives (not visible).

Located centrally between the tubular support members 48 and 50 is a central or middle tubular support member 74 comprising a horizontal section 76 and a vertical section 78 disposed along a vertical axis Y". The horizontal section 76 of the third support member 74 is considerably shorter than the horizontal sections 52R and 52L, with the vertical section 78 being approximately centered in a vertical, transverse plane joining respective forward edges of the inner walls 64 and 66. A hydraulic motor mounting ring 80 is received within and fixed to a lower location of the vertical section 78, and a stop ring 82 is received on and fixed to an upper location of the vertical section 78.

A topper/shredder rotor 84 includes a central cylindrical tube 86 received on, and mounted for rotation about, the vertical section 78 of the central support member 74. A reversible, hydraulic motor 88 includes an upper body projecting upwardly within the motor mounting ring 80. A mounting flange 90 at the bottom of the body is positioned against, and bolted to, the mounting ring 80. Hydraulic fluid supply/return hoses 92 and 94 are coupled to respective upper locations of the motor body and extend through the tubular support member 48. The rotor tube 86 is received on the vertical section 78 of the central tubular support member 74, with the upper end of the tube 86 abutting the stop ring 82. Suitable bearings (not shown) support the rotor tube 86 for rotation about the axis Y". A splined motor drive hub 96 is received on a splined output shaft (not shown) projecting from the bottom of the motor 88. A circular drive plate 98 is welded within a lower end of the rotor tube 86, and the drive hub 96 is secured to the drive plate 98 by a plurality of screws (not shown).

The chopper/shredder rotor 84 further includes four vertically spaced, knife mount disks 100, and each disk has eight cutting knives 102 fixed about its periphery at equally spaced locations. The spacing of the disks 100 is such as to have the knives 102 pass closely adjacent fixed knives mounted within the knife mounting grooves 68 and 72, respectively, located in the right- and left-hand wings 56 and 58. Fixed to, and extending radially from the, rotor tube 86 and located between and fixed to adjacent disks 100 are a plurality of fins 104, which not only rigidify the disks 100 but act to generate air flow. This air flow is aided by a plurality of circular holes 106 located in a circular pattern in each of the disks 100 at respective radial locations approximately halfway between the axis Y" and the path traced by the outer tips of the knives 102.

Figure 3:
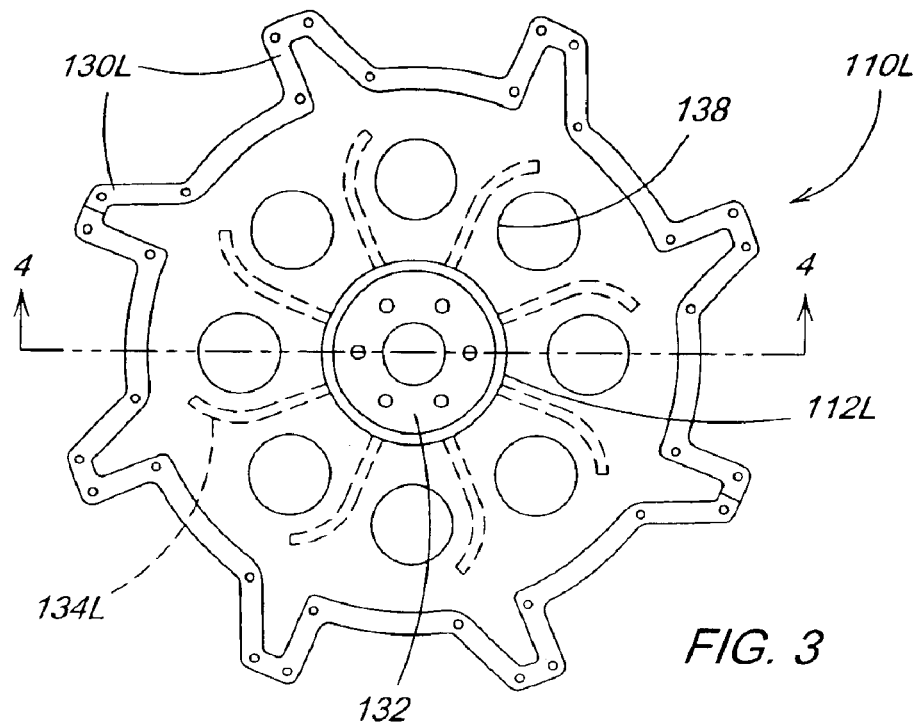
FIG. 3 is a top view of the right-hand cane top gathering device shown in FIG. 2.
Figure 4:
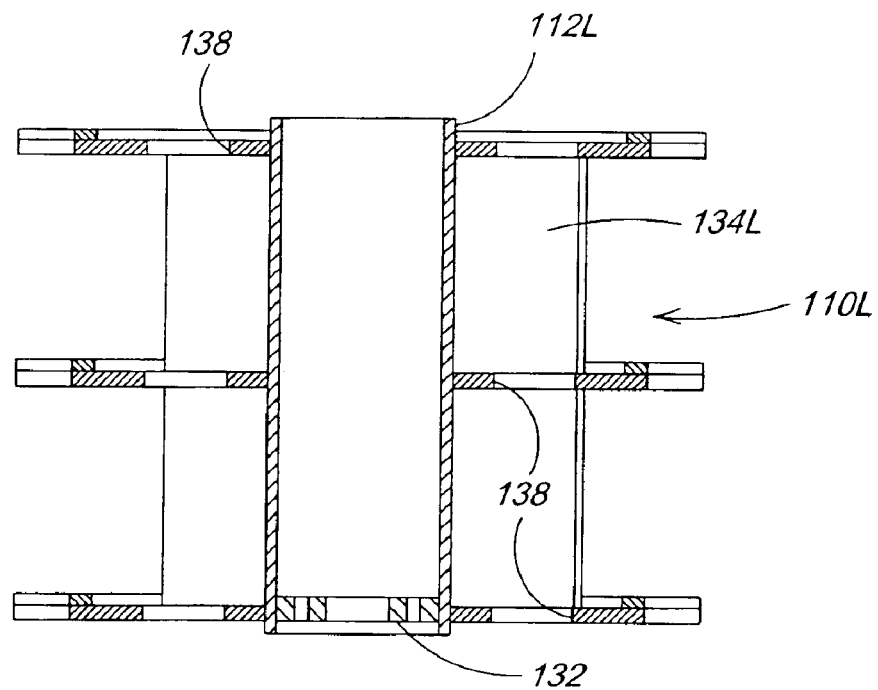
FIG. 4 is a vertical sectional view taken along line 4—4 of FIG. 3.

Cane tops are gathered for being processed by the topper/shredder rotor 84 by right- and left-hand gathering rotors 110 and 112, respectively, that include central cylindrical tubes or cores 112R and 112L, respectively mounted for rotation about the vertical sections 52R and 52L of the support tube members 48 and 50. Provided for driving the gathering rotors 110R and 110L are right-and left-hand hydraulic motors 114R and 114L, respectively, the motors having respective bodies inserted through the motor mounting rings 53R and 53L, with the bodies having respective mounting flanges 116R and 116L engaged with, and bolted to the mounting rings 53R and 53L. The hydraulic motor 114R includes a pair of hydraulic fluid supply/return hoses 118 and 120 which extend through the tubular support member 48 from respective fittings adjacent an upper location of the body of the motor 114R. Similarly, the hydraulic motor 114L includes a pair of hydraulic fluid supply/return hoses 122 and 124 which extend through the tubular support member 50 from respective fittings adjacent an upper location of the body of the motor 114L. Fixed to respective splined output shafts (not shown) projecting down from the lower end of the hydraulic motors 114R and 114L are respective drive hubs 126 and 128. As can best be seen in FIGS. 3 and 4, circular drive plates 130 and 132 are respectively fixed within the lower ends of the rotor tubes 112R and 112L. The tubes 112R and 112L respectively have upper ends engaged with the stop rings 54R and 54L. The drive plates 130 and 132 are then respectively positioned against, and secured to the drive hubs 126 and 128 by a plurality of screws (not shown). The motors 114R and 114L are each reversible, and with respect to being viewed from the top, the motor 114R is controlled for driving the gathering rotor 110R counterclockwise, and the motor 114L is controlled for driving the gathering rotor 110L clockwise.

The gathering rotors 110R and 110L further include respective sets of three vertically spaced gathering disks 130R and 130L which are respectively welded to the rotor tubes 112R and 112L. Arranged at equally spaced locations about the periphery of each of the gathering disks 130R and 130L are respective sets of eight gathering projections 132R and 132L. Projecting radially from and fixed to the rotor tubes 112R and 112L, and extending between and fixed to adjacent ones of the gathering disks 130R and 130L are fan blades 134R and 134L. While the blades 134R and 134L may be of any desired shape capable of generating an air stream for aiding in conveying cane top pieces outwardly beyond the throat 24 of the harvester 10, they are here shown as having a simple shape comprising a major straight base section that is joined to a tip section curved or angled from the base section such that it leads in the direction of rotation of the respective gathering rotor 110R and 110L. The flow of air generated by the fan blades 134R and 134L is aided by a plurality of circular air passages 136 and 138, respectively provided in each of the gathering disks 130R and 130L.

The operation of the topper/shredder 30 is as follows. Assuming that the harvester 10 is harvesting a row of cane of a plot of standing cane located to the right-hand side of the harvester 10, the hydraulic motor 88 will be controlled to cause the topper/shredder rotor 84 to be rotated counterclockwise, as viewed in FIG. 2. At the same time, the hydraulic motors 114R and 114L will be respectively controlled for driving the gathering rotors 110R and 110L counterclockwise and clockwise, as viewed in FIG. 2.

With the topper/shredder rotor 84 rotating counterclockwise, the cutting knives 102 will engage and carry cane tops being delivered to it by the projections 132R of the gathering rotor 110R into engagement with the gathering rotor 110L, which in turn carries the cane tops to the point where they are cut into pieces by the cooperative cutting action of the knives 102 and the stationary blades mounted in the blade mount grooves 72 and 78. Furthermore, the fins 104 of the rotor 84 will tend to deflect the air stream delivered by the fan blades 134R to the left where it is again deflected by the fan blades 134L and caused to flow to the left in front of the curved surface 62 of the left wing 58 of the frame 44. This stream of air will entrain the cut pieces of cane top and deliver it sideways with sufficient force to cause most of the top material to be deposited to the left of the throat 24 of the harvester 10.

It will be understood that when harvesting a row of cane from a plot of cane located to the left of the harvester 10, the chopper/shredder rotor 84 will be rotated in the clockwise direction resulting in the generated air stream passing outwardly in front of the curved surface 60 so as to carry top pieces to the right of the throat 24 of the harvester.

Having described the preferred embodiment, it will become apparent that various modifications can be made without departing from the scope of the invention as defined in the accompanying claims.

What is claimed is:

1. In a topper/shredder mechanism for a cane harvester including a rotatable topper/shredder element mounted for rotation about an upright axis, and a cane top gathering arrangement for directing cane tops to said topper/shredder element, the improvement comprising:

said topper/shredder element including a center support disposed along said axis;

at least two topped/shredder disks spaced from each other along said axis and joined to said center support;

each topper/shredder disk having a plurality of cutting blades joined to, and projecting outwardly from, spaced locations about its periphery;

and at least one air-assist vane extending between said at least two topper/shredder disks for generating a stream of air for aiding sideways discharge of shredder cane tops from said topper/shredder element.

2. The topper/shredder mechanism, as defined in claim 1, wherein said topper/shredder disks an upper, a lower and at least one intermediate topper/shredder disk;

and said at least one air-assist vane including first and second sections respectively extending between said upper and at least one intermediate disks, and between said lower and at least one intermediate disks.

3. The topper/shredder mechanism, as defined in claim 1, wherein said topper/shredder element includes at least three air-assist vanes spaced equally from each other about said axis.

4. The topper/shredder mechanism, as defined in claim 1, wherein said cane top gathering arrangement includes right- and left-hand cane top gathering rotors respectively mounted for counter-rotating about respective second and third upright axes located ahead of and at opposite sides of said first mentioned upright axis; and each cane top rotor including a plurality of fan blades for generating a stream of air for aiding in the sideways discharge of cane top pieces.

5. The topper/shredder mechanism, as defined in claim 4, wherein each of said cane top gathering rotors includes a plurality of vertically spaced disks; and said disks each containing holes for permitting air to be drawn through them due to the action of said fan blades.

* * * * *